(12) United States Patent
Kim

(10) Patent No.: US 11,025,817 B2
(45) Date of Patent: Jun. 1, 2021

(54) ELECTRONIC DEVICE AND METHOD FOR CONTROLLING ELECTRONIC DEVICE

(71) Applicant: Samsung Electronics Co., Ltd., Gyeonggi-do (KR)

(72) Inventor: Nam-Jin Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/473,904

(22) PCT Filed: Dec. 26, 2017

(86) PCT No.: PCT/KR2017/015472
§ 371 (c)(1),
(2) Date: Jun. 26, 2019

(87) PCT Pub. No.: WO2018/124692
PCT Pub. Date: Jul. 5, 2018

(65) Prior Publication Data
US 2019/0342494 A1  Nov. 7, 2019

(30) Foreign Application Priority Data

Dec. 26, 2016  (KR) ........................ 10-2016-0179282

(51) Int. Cl.
*H04N 5/232*  (2006.01)
*H04N 5/265*  (2006.01)
*G06K 9/62*  (2006.01)

(52) U.S. Cl.
CPC ....... *H04N 5/23232* (2013.01); *G06K 9/6215* (2013.01); *H04N 5/265* (2013.01)

(58) Field of Classification Search
None
See application file for complete search history.

(56) References Cited

U.S. PATENT DOCUMENTS 8,922,695 B2 * 12/2014 He .................... G02B 13/06
                                                348/333.05
10,021,297 B2 *  7/2018 Kwon ..................... G06F 3/017
(Continued)

FOREIGN PATENT DOCUMENTS

KR    1020050109190    11/2005
KR    1020110104698     9/2011
(Continued)

OTHER PUBLICATIONS

Nam, Min Gyu, "The Night View of Seoul by Photographer Using G5: Do No Ignore Phone Camera, Again", May 11, 2016 (httP//ppss.kr/archives/80260), See p. 1, pp. 24.
(Continued)

*Primary Examiner* — Chikaodili E Anyikire
(74) *Attorney, Agent, or Firm* — The Farrell Law Firm, P.C.

(57) ABSTRACT

An electronic device is disclosed. The disclosed electronic device comprises at least one camera module, a memory, and a processor electrically connected to the camera module and the memory, wherein the memory stores instructions that, when executed, cause the processor to store a first frame, which is generated using an image inputted through the camera module, as a first image in the memory, and if a degree of similarity between a second frame and a third frame, which are generated using the image inputted through the camera module, is equal to or greater than a predetermined value, cause the processor to generate a second image by synthesizing at least one frame comprising the second frame and the third frame and store the second image in the memory. Other various embodiments are also possible.

17 Claims, 12 Drawing Sheets

(56) References Cited

U.S. PATENT DOCUMENTS

| | | | |
|---|---|---|---|
| 2012/0038747 A1 | 2/2012 | Kim et al. | |
| 2013/0076944 A1* | 3/2013 | Kosaka | H04N 5/23296 348/240.2 |
| 2015/0009372 A1* | 1/2015 | Min | H04N 5/2258 348/262 |
| 2016/0073040 A1 | 3/2016 | Jen et al. | |
| 2016/0091139 A1 | 3/2016 | Levine et al. | |
| 2016/0112632 A1* | 4/2016 | Du | G03B 37/02 348/36 |

FOREIGN PATENT DOCUMENTS

| | | |
|---|---|---|
| KR | 1020120021762 | 3/2012 |
| KR | 1020160021238 | 2/2016 |

OTHER PUBLICATIONS

Translation of NAM, Min Gyu, "The Night View of Seoul by Photographer Using G5: Do No Ignore Phone Camera, Again", May 11, 2016 . . . (http://ppss.kr/archives/80260), See p. 1, pp. 27.
PCT/ISA/210 Search Report issued on PCT/KR2017/015472, pp. 5.
PCT/ISA/237 Written Opinion issued on PCT/KR2017/015472, pp. 6.
Na, Min Gyu, "The Night View of Seoul by Photographer Using G5: Do No Ignore Phone Camera, Again", May 11, 2016 (httP//ppss.kr/archives/80260), See p. 1, pp. 24.

* cited by examiner

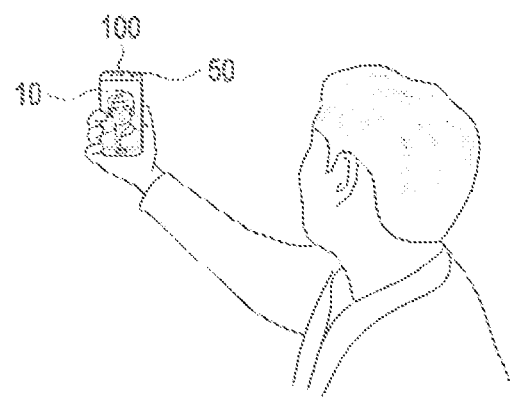
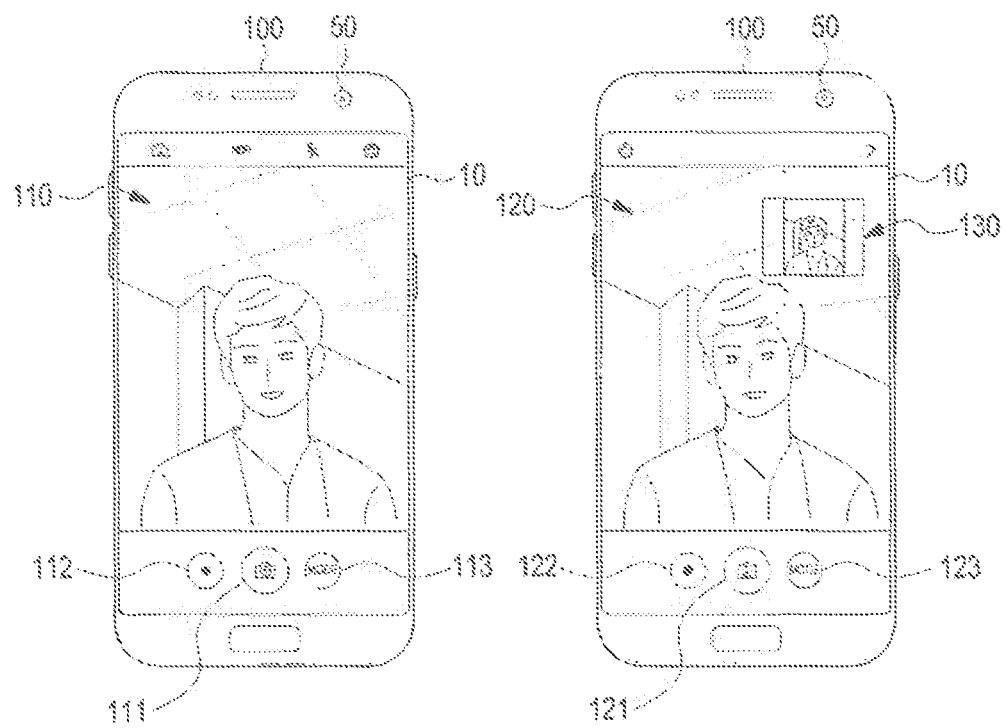
FIG.1A
FIG.1B  FIG.1C

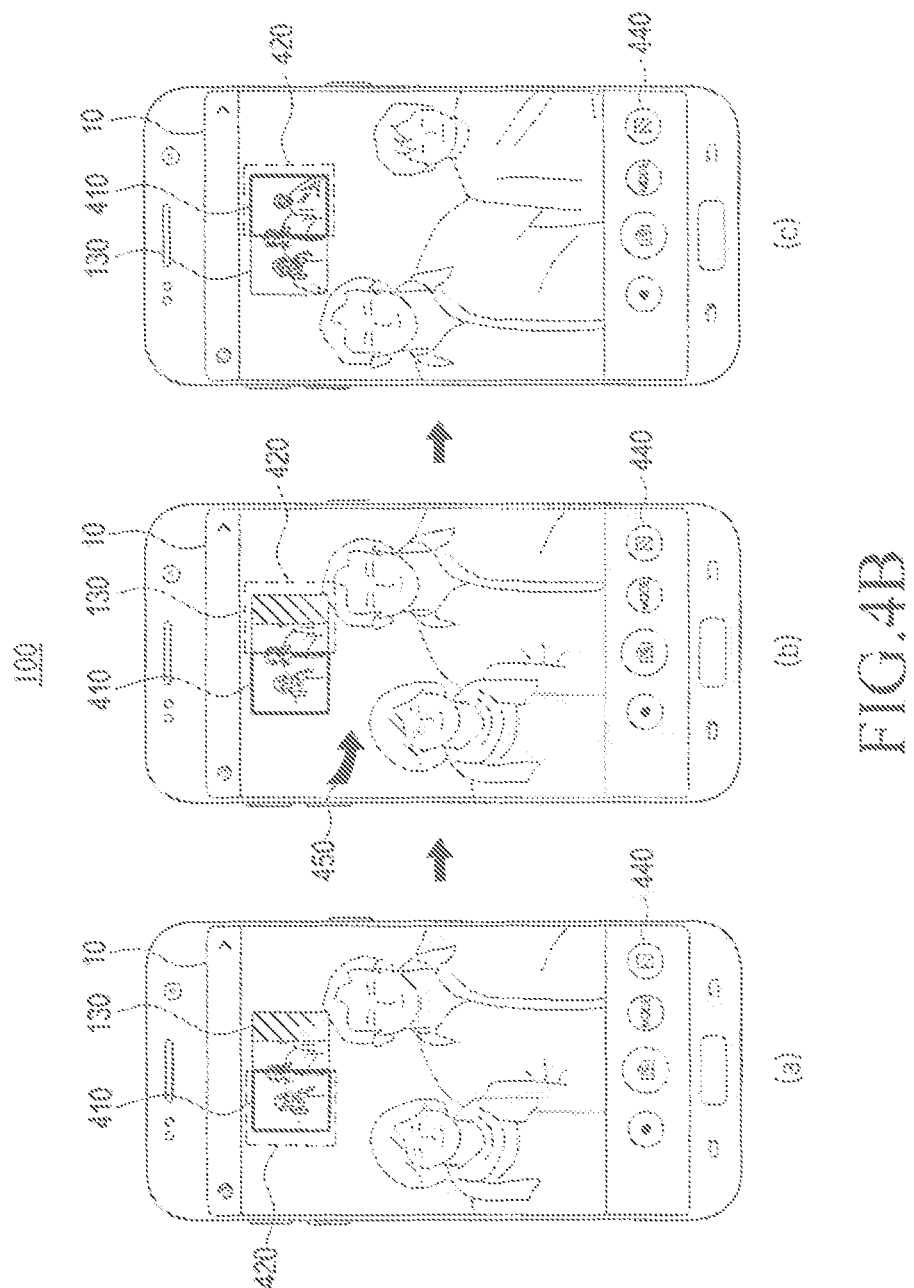

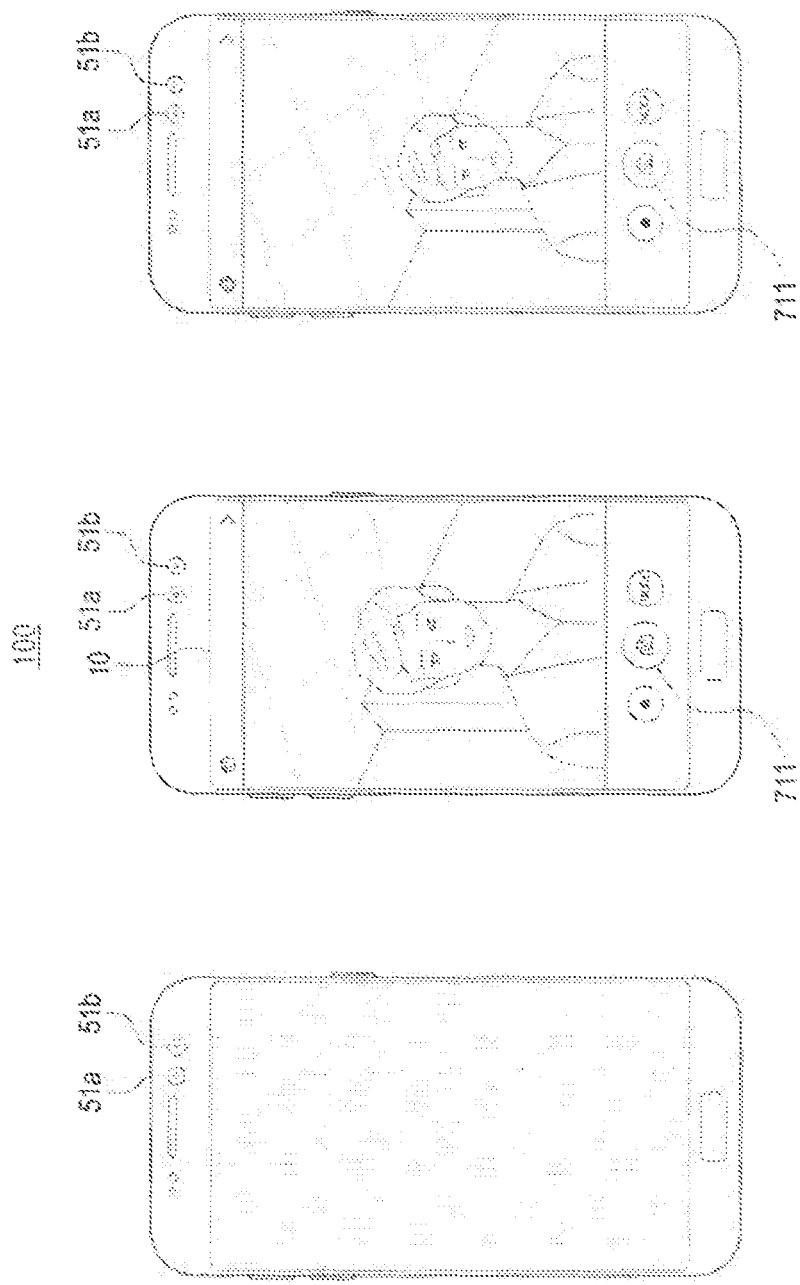

ELECTRONIC DEVICE AND METHOD FOR CONTROLLING ELECTRONIC DEVICE

PRIORITY

This application is a National Phase Entry of PCT International Application No. PCT/KR2017/015472, which was filed on Dec. 26, 2017 and claims priority under 35 U.S.C. § 119 of Korean Patent Application No. 10-2016-0179282, filed on Dec. 26, 2016, in the Korean Intellectual Property Office the disclosure of each which is incorporated herein by reference in its entirety.

BACKGROUND

1. Field

Various embodiments of the present disclosure relate to a control method in which an electronic device enters a photography mode to easily capture an image having a wide angle of view after capturing an image through a camera, and the electronic device.

2. Description of Related Art

With diversification of functions of portable electronic devices (e.g., smartphones, tablet personal computers (PC), etc.), electronic devices basically having, mounted thereon, a camera module with a photographing function have come into wide use. The increasing user demands for various and high-performance functions have accelerated development of the electronic device and a photographing function using the electronic device.

A photographing function to obtain a single image by capturing a plurality of images needs movement of the electronic device, thus it is required that more complex and precise manipulation of the user than a normal photographing function.

SUMMARY

A photography mode for obtaining an image by capturing a plurality of images and a photography mode for obtaining an image by capturing the image are different from each other, such that the user needs to additionally manipulate the electronic device in changeover between the two photography modes.

For example, when a captured image after capturing of a selfie (or self-shot) does not include the entire desired object, the user needs to change to a photography mode for capturing or taking a wide self-shot to include the entire desired object in a single image. In changeover to the photography mode for capturing the wide self-shot from a photography mode for capturing a self-shot, the user manipulates the electronic device for photography mode changeover and thus needs again compose and capture a new self-shot.

An electronic device according to an embodiment includes at least one camera module, a memory, and a processor electrically connected with the camera module and the memory, in which the memory stores instructions for causing the processor, when executed, to store a first frame generated using an image input through the camera module as a first image in the memory, and to generate a second image by synthesizing at least one frame comprising a second frame and a third frame that are generated using the image input through the camera module, and to store the generated second image in the memory when a similarity between the second frame and the third frame is greater than or equal to a preset value.

A control method of an electronic device including a camera module according to an embodiment includes storing as a first image, a first frame generated using an image input through a camera module, identifying whether a similarity between a second frame and a third frame that are generated using the image input through the camera module satisfies a preset value, and generating a second image by synthesizing at least one frame comprising the second frame and the third frame, when the similarity is greater than or equal to the preset value.

As described above, an electronic device according to various embodiments of the present disclosure may obtain an image by easily changing a photography mode while maintaining a current composition without a user's additional input for changing the photography mode.

Other effects obtained or expected from embodiments of the present disclosure will be directly or indirectly disclosed in the detailed description of the embodiments of the present disclosure. For example, various effects expected according to an embodiment of the present disclosure will be disclosed in the detailed description to be made below.

BRIEF DESCRIPTION OF THE DRAWINGS

FIG. 1 illustrates a situation in which an electronic device according to an embodiment analyzes an input image and generates a plurality of images.

FIGS. 4A and 4B are views for describing a process of performing a wide self-shot function in an electronic device according to an embodiment.

FIG. 7 illustrates an operation when similarities of frames sequentially input to an electronic device according to an embodiment are less than a preset value.

DETAILED DESCRIPTION OF THE DISCLOSURE

Figure 2:
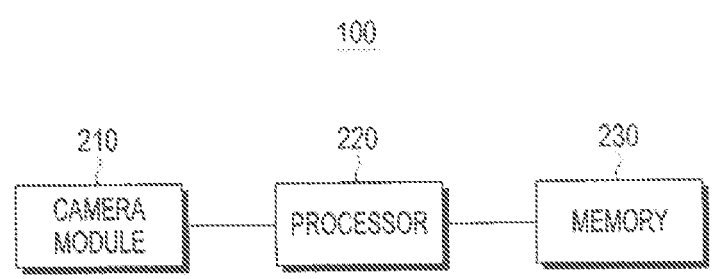
FIG. 2 is a block diagram of an electronic device according to an embodiment.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondarily," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

FIG. 1 illustrates a situation in which an electronic device according to an embodiment of the present disclosure analyzes an input image and generates a plurality of images.

Referring to FIG. 1, examples of the electronic device 100 according to an embodiment of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. Hereinbelow, the electronic device 100 is assumed to be a smartphone.

According to an embodiment, the electronic device 100 may include a camera module 50. There may be at least one camera module 50. For example, the electronic device 100 may include one camera module on a front surface (e.g., a surface having a display arranged thereon) and another camera module on a rear surface (e.g., an opposite surface to the front surface). However, the present disclosure is not limited to this example. For example, the electronic device 100 may include a plurality of camera modules on the front surface and a plurality of camera modules on the rear surface. In another example, the electronic device 100 may include at least one camera module, at least a part of which is movable to the front surface or the rear surface.

The user may capture a still image, a moving image, etc., by using the camera module 50 included in the electronic device 100.

Referring to FIG. 1(a), the user may perform a "self-shot or selfie" function using the electronic device 100. The self-shot function allows the user to capture herself/himself using the camera module 50 installed on the front surface in the electronic device 100, in which an image currently input through the camera module 50 may be stored in the memory of the electronic device 100 or an external device through the display 10 to adjust an angle of view or viewing angle and a composition for capturing.

The self-shot function may include short-range photographing in which a distance between the electronic device 100 and an object is within a specific distance (e.g., about 1 m). For example, in the case that an object is photographed using the self-shot function, assuming that a major-axis viewing angle of the camera module 50 for photographing the object is about 65 degrees and a length of an arm of the user is about 50 cm, the electronic device 100 may display an image of the object of 70 cm on the display 10.

Looking at a result of photography using the self-shot function, an angle of view may not be sufficiently large enough to photograph a user and other users at the same time. To photograph another user as well as the user at the same time, the electronic device 100 may provide a panoramic photographing function even when performing the self-shot function. The panoramic photographing function obtains an image having a wide viewing angle using a camera module having a limited viewing angle. In panoramic photography, the user may obtain a plurality of images while causing the camera module to move (rotate) in a horizontal direction or a vertical direction. The electronic device 100 including the camera module may generate one continuous image having a wide viewing angle by stitching the obtained images together. A panoramic image captured in this way may be transversely long in case of being captured by horizontal movement.

By applying such a panoramic photographing function to the self-shot function, the user may photograph not only the user, but also a nearby object (e.g., a person, a landscape, etc.) in an image.

However, the panoramic photographing function may be applied to a normal photographing function. For example, when desiring to capture a landscape image having a wider viewing angle after capturing a landscape image, the user may capture such a wide-viewing angle image by using panoramic photography.

According to an embodiment of the present disclosure, the electronic device 100 may analyze an input image and generate a first image by using the self-shot function and generate a second image by using a wide self-shot or wide-selfie function in which the panoramic photographing function is applied to the self-shot function.

Referring to FIG. 1(b), the electronic device 100 may display on a display 10, a first user interface 110 for performing the self-shot function based on input of a signal executing a camera function.

The electronic device 100 displaying the first user interface 110 on the display 10 may display an image input through the camera module 50, for example, in a central portion of the display 10. The electronic device 100 may display various icons for changing a photography setting value in an upper end of the display 10. The electronic device 100 may display a still image photographing icon 111, a moving image photographing icon 112, a mode changeover icon 113, and so forth.

The electronic device 100 may generate as the first image, an image (e.g., a first image frame) currently input by a touch of the still image photographing icon 111. However, the present disclosure is not limited to this example. For example, the electronic device 100 may capture the currently input image by using a heartrate sensor (not shown) arranged on a rear surface of the electronic device 100 (e.g., a surface opposite to the front surface where the display 10 is arranged). The electronic device 100 may also capture the currently input image by recognizing user's voice, a preset gesture, or user's facial expression.

The electronic device 100 may generate the second image by analyzing an image input after capturing of the first image. The second image may be, for example, an image generated using the wide self-shot function.

According to an embodiment, the electronic device 100 may compare image frames (hereinafter, frames), generated sequentially using the first frame after capturing of the first image, with each other. The electronic device 100 may compare a second frame and a third frame, generated using the image input through the camera module 50, with each other after capturing of the first image. However, the present disclosure is not limited to this example. For example, the electronic device 100 may compare the first frame with the second frame. The first frame, the second frame, and the third frame may be continuously generated frames. However, the present disclosure is not limited to this example. For example, the electronic device 100 may select as the third frame, a frame generated after generation of a predetermined number of frames from generation of the second frame.

According to an embodiment, the electronic device 100 may identify a similarity between the second frame and the third frame. For example, the electronic device 100 may compare the second frame with the third frame after changing them into edge-enhanced images. According to another embodiment, the electronic device 100 may identify the similarity by comparing a periphery of the second frame with a periphery of the third frame or by comparing a color of an object included in the second frame with a color of an object included in the third frame. A way to identify a similarity between input frames is not limited to this example.

The electronic device 100 may identify that the second frame and the third frame are similar to each other when the similarity therebetween is identified as 50% or higher as a result of comparison between them. However, the present disclosure is not limited to this example. For example, the user may change a similarity such that the electronic device 100 may identify that frames are similar to each other when a similarity therebetween is greater than or equal to 30% or when the similarity therebetween is greater than or equal to 70%.

According to an embodiment, the electronic device 100 may identify a moving direction of the electronic device 100 based on the result of comparison between the second frame and the third frame for similarity identification. For example, the electronic device 100 may identify that the electronic device 100 is moving to the right when an object in the second frame has moved to the left in the third frame. The electronic device 100 may also identify that the electronic device 100 is moving upward when an object in the second frame has moved down in the third frame.

Referring to FIG. 1(*c*), according to an embodiment, the electronic device 100 may perform the wide self-shot function in case of identifying that the second frame and the third frame, generated sequentially using the image input through the camera module 50, are similar to each other. To this end, the electronic device 100 may display on the display 10, the second user interface 120 for performing the wide self-shot function.

According to another embodiment, the electronic device 100 may identify movement of the electronic device 100 by using various embedded sensors. For example, the electronic device 100 may identify the moving direction information of the electronic device 100 by using a gyro sensor, an acceleration sensor, etc. More specifically, when the electronic device 100 moves from a motion-related sensor included in the electronic device 100, such as the gyro sensor, the acceleration sensor, etc., within a preset angle (e.g., 10 degrees) with respect to a direction in which the camera module 50 is oriented within a preset time (e.g., 1 second), the electronic device 100 may perform the wide self-shot function.

Upon identifying the moving direction of the electronic device 100, the electronic device 100 may display on the display 10, a direction in which the electronic device 100 has to move (rotate), by including the direction in the second user interface 120 for the wide self-shot function.

The electronic device 100 displaying the second user interface 120 may display an image input through the camera module 50, for example, in the central portion of the display 10. The electronic device 100 may display various icons for changing a photography setting value in an upper end of the display 10. The electronic device 100 may display a still image photographing icon 121, a moving image photographing icon 122, a mode changeover icon 123, and so forth.

When displaying the second user interface 120, the electronic device 100 may display a third user interface 130 guiding wide self-shot photography on the display 10 together or sequentially. The third user interface 130 may display a currently input image, a region that has to be further photographed to generate a wide self-shot image, an already captured image, an image generated based on the already captured image, etc.

The third user interface 130 may display the currently input image and the already captured image by using a thumbnail image obtained by reducing the size of the input image.

According to an embodiment, the electronic device 100 may propose a direction in which the electronic device 100 has to move for wide self-photography based on the identified rotating or moving direction of the electronic device 100. When the user rotates or moves the electronic device 100 along a guided direction displayed on the display 10, the electronic device 100 may generate the second image by using an input image.

That is, the electronic device 100 may immediately start a second photography mode (e.g., the wide self-shot function) by analyzing an input image after executing a first photography mode (e.g., the self-shot function). Thus, the user having obtained a self-shot image (e.g., the first image) by using the self-shot function may generate and obtain a wide self-image (e.g., the second image) without touching the display 10 of the electronic device 100 or inputting a physical key to execute the wide self-shot function.

FIG. 2 is a block diagram of an electronic device according to an embodiment.

Referring to FIG. 2. According to an embodiment, the electronic device 100 may include a camera 210, a processor 220, and a memory 230. However, the electronic device 100 may be implemented to more or less elements than those illustrated in FIG. 2. For example, the electronic device 100 may include input modules (e.g., a physical key, a proximity sensor, a biometric sensor, etc.), a power supply unit, and so forth.

The camera module 210 may perform a general digital camera function by including a lens unit, an image sensor, etc., to photograph an object. The camera module 210 may also capture a plurality of images for panoramic photography.

The camera module 210 may include an illumination sensor for illumination measurement, a distance sensor for measurement of a distance from an object, etc., to properly set the photography mode. The camera module 210 may be arranged on the front surface of the electronic device 100 (e.g., a surface on which the display is arranged) and the rear surface of the electronic device 100 (e.g., a surface opposite to the front surface), respectively, or a plurality of camera modules may be arranged on the front surface or the rear surface.

The processor 220 controls multiple hardware or software components connected to the processor 220 by driving an operating system (OS) or an application program, and performs processing and operations with respect to various data.

According to an embodiment, the processor 220 may display on a display (not shown), the first user interface and the second user interface that are stored previously in the memory 230. However, the present disclosure is not limited to this example. For example, the processor 220 may receive a user interface of an external other electronic device or a server through a communication unit (not shown) and display the received user interface.

The processor 220 may receive an electrical image signal (e.g., raw format data) obtained by the camera module 210 and perform various image processing (e.g., color interpolation, edge enhancement, noise cancellation, etc.) with respect to the same to make the electrical image signal look real, and may process the electrical image signal suitably for characteristics of the screen of the display and store the processed electrical image signal in the memory 230.

According to an embodiment, the processor 220 may control an overall operation of panoramic photography. For example, the processor 220 may identify validity of an input image according to distortion or a blur of an input image, etc., and provide a photography guide. A motion of the electronic device 100 may also be sensed based on a signal input from at least one sensor (not shown) (e.g., the gyro sensor, the acceleration sensor, an electromagnetic sensor, etc.).

The processor 220 may compare and analyze images input through the camera module 210 and identify a current rotating or moving state of the electronic device 100. It may be difficult for the processor 220 to identify the rotating or moving state of the electronic device 100 merely by analyzing the input images. For example, when an input image has few characteristics or a repeated pattern, the electronic device 100 may have a difficulty in identifying the rotating state of the electronic device 100 merely by image analysis. In this case, the electronic device 100 may identify rotation or movement of the electronic device 100 by using a detection value collected by the at least one sensor (e.g., the gyro sensor, the acceleration sensor, the electromagnetic sensor, etc.).

The electronic device 100 may identify rotation or movement of the electronic device 100 by complimentarily using various sensors, an image analysis method, etc.

According to an embodiment of the present disclosure, the processor 220 may generate an image input through the camera module 210 as the first image, analyze a similarity between sequentially input images, and synthesize a plurality of sequentially input frames to generate the second image.

The memory 230 may store an image captured by the electronic device 100. The memory 230 may store an image received by the electronic device 100 from an external other electronic device or a server.

According to an embodiment, the memory 230 may store the first image generated based on control of the processor 220, store sequentially input images, and store the second image generated by control of the processor 220.

According to an embodiment, an electronic device includes at least one camera module, a memory, and a processor electrically connected with the camera module and the memory, wherein the memory stores instructions for causing the processor, when executed, to: store a first frame generated using an image input through the camera module as a first image in the memory, and generate a second image by synthesizing at least one frame comprising a second frame and a third frame that are generated using the image input through the camera module, and store the generated second image in the memory when a similarity between the second frame and the third frame is greater than or equal to a preset value.

According to an embodiment, the instructions may cause the processor further to identify the similarity by comparing a shape of an object located in a periphery of the second frame with a shape of an object located in a periphery of the third frame.

According to an embodiment, the instructions may cause the processor further to identify the similarity by comparing a shape of an object included in an edge-enhanced second image with a shape of an object included in an edge-enhanced third image after changing the second frame and the third frame into the edge-enhanced second images and the edge-enhanced third image.

According to an embodiment, the instructions may cause the processor further to identify the similarity by comparing a color of an object included in the second frame with a color of an object included in the third frame.

According to an embodiment, the instructions may cause the processor further to identify at least one of a moving direction or a rotating direction of the electronic device based on movement of the object included in the second frame and the object included in the third frame, when the similarity is greater than or equal to a preset value.

According to an embodiment, the electronic device may further include a display and the instructions may cause the processor further to identify the identified moving direction or rotating direction of the electronic device as a first direction and to control a guide guiding the electronic device in the first direction to be displayed on the display.

According to an embodiment, the instructions may cause the processor further to control a guide guiding the electronic device in a second direction opposite to the first direction to be displayed on the display, when the electronic device moves in the first direction by a preset distance or a preset angle or for a preset time.

According to an embodiment, the instructions may cause the processor further to generate the second image by synthesizing generated frames, when the electronic device moves in the second direction by a preset distance or a preset angle or for a preset time.

According to an embodiment, the camera module may include a first camera module and a second camera module, the electronic device may further include a sensor module, and the instructions may cause the processor further to stop activation of the first camera module and control the second camera module to be activated, based on input of at least one of the sensors included in the sensor module.

According to an embodiment, the first camera module and the second camera module have different angles of view.

FIG. 3 illustrates an example of user manipulation and a corresponding photography screen when an electronic device according to an embodiment performs a wide self-shot function.

Referring to FIG. 3, according to an embodiment, the electronic device 100 may capture a reference image 310 as a first procedure (a) in wide self-shot photography. As a second procedure (b), the electronic device 100 may capture images 311, 312, and 313 located to the left with respect to the reference image 310 due to rotation or movement to the left. As a third procedure (c), the electronic device 100 may capture images 314, 315, and 313 located to the right with respect to the reference image 310 due to rotation or movement to the right.

The electronic device 100 may notify the user of a state where a motion blur (hand shaking, etc.) or distortion occurs in comparison to the reference image, through a proper user interface, and further guide proper photographing direction and photographing state. In this case, the user interface notifying the occurrence state of the motion blur or the distortion may include a character message or graphics. The user interface may display an arrow, etc., to guide a photographing direction. For example, in the second procedure (b), when photography is performed in the left direction to the end, the electronic device 100 may display an arrow in the opposite (right) direction.

In addition, the user interface notifying the occurrence state of the motion blur or distortion, the photographing direction, etc., may generate a sound such as a proper voice or a notification sound, and may notify the user of a shaking state by using a vibration function of the electronic device 100 in case of occurrence of motion blur.

The user may capture the reference image having the user in the center by using the wide self-shot function and capture the left and right regions of the reference image using panoramic photography.

Referring to FIG. 3, in the wide self-shot photography, images captured using panoramic photography in a burst-shot mode are illustrated.

According to an embodiment, the electronic device 100 may set a proper operation mode between the burst-shot mode and a capture mode in the wide self-shot photography.

Similarly with the burst-shot photography, the burst-shot mode may continuously capture a plurality of images during swivel for panoramic photography and synthesize some regions (slices) of the captured images. In a capture mode, a smaller number of images than in the burst-shot mode are captured and most regions (tiles) of the captured images and a broader region than a region used in synthesis in each of the images captured in the burst-shot mode may be used in synthesis.

That is, the burst-shot mode is a photography scheme that continuously performs continuous photography at relatively short intervals in photographing of a plurality of images, and the capture mode is a photography scheme that captures a plurality of images to minimize an overlapping region between the captured images without periodicity.

Generally, the burst-shot mode may make user manipulation easy, whereas the capture mode allows the user to obtain a captured image having a superior quality even in a poor photographing environment.

Thus, an embodiment of the present disclosure may properly set the photography mode according to an illumination due to a high possibility of the motion blur during photography in a low-illumination situation such as an indoor environment. That is, panoramic photography may be performed in the burst-shot mode in a normal illumination situation, and panoramic photography may be performed in the capture mode in a low-illumination situation. The following description will be made assuming photography in the burst-shot mode.

Figure 3A:
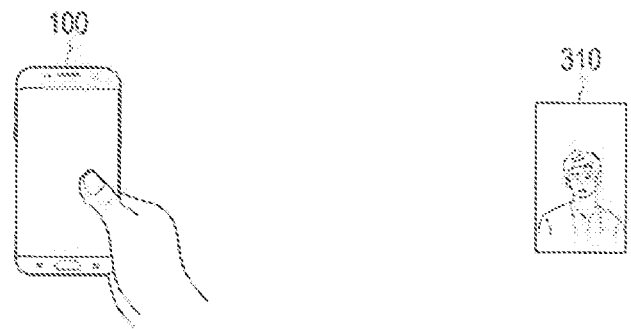
FIG. 3 illustrates an example of user manipulation and a corresponding photography screen when an electronic device according to an embodiment performs a wide self-shot function.
Figure 3B:
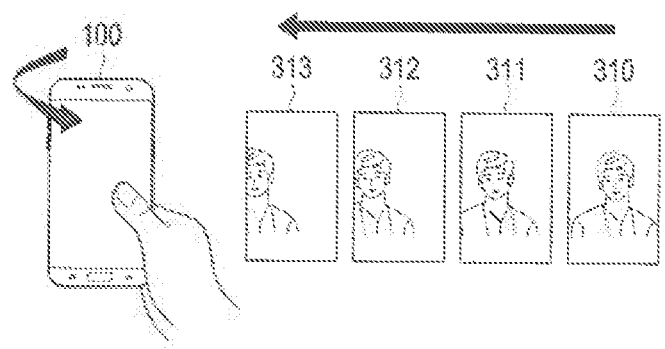
Figure 3C:
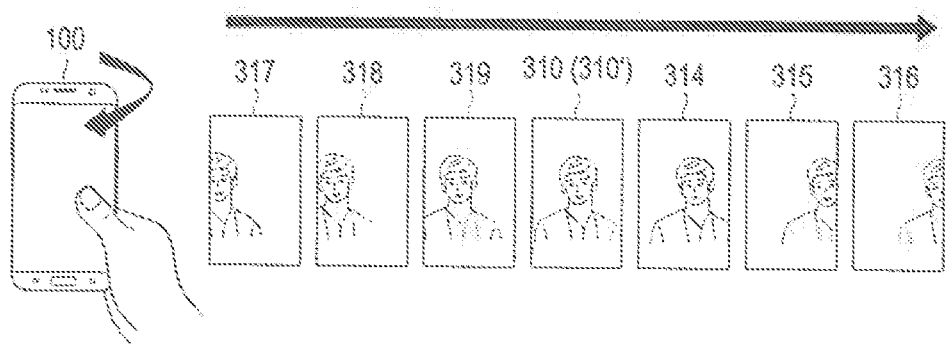

In the wide self-shot photography illustrated in FIG. 3, after the first reference image 310 is captured as illustrated in FIG. 3(a), images are captured while rotating the electronic device 100 in a side (left) direction as illustrated in FIG. 3(b), after which the electronic device 100 is rotated in the other side (right) direction to return to the initial photographing position as illustrated in FIG. 3(c), and then the remaining region in the other side direction may be performed. According to various embodiments, after photography is performed while rotating the electronic device 100 to the right, the electronic device 100 may be rotated to the left to return to the initial photographing position, and then the remaining region in the left direction may be performed.

In this case, the reference image captured initially may be different from images that are input when the electronic device 100 returns to the initial photographing position after performing photography in the one side (left or right) direction. For example, when a difference between input images is smaller or larger than a preset reference or the electronic device 100 moves faster than a preset speed for panoramic photography, the electronic device 100 may have an error in image synthesis.

To identify a difference between the initially captured reference image and an input image after returning to the initial photographing position, the electronic device 100 may detect a face from each image and compare sizes of the detected faces with each other. The electronic device 100 may perform inter-face distance comparison when several faces are detected in the initially captured reference image. In addition, the electronic device 100 may also identify a difference between images by identifying information about a distance to an object for each image through a distance sensor (e.g., a phase difference sensor) that detects a distance of an object and comparing the information with each other.

When displaying a position and a photographing state in the entire wide self-shot photographing region with respect to currently captured images through a separate user interface during wide self-shot photography is taken into consideration, a difference between the reference image and an input image after returning to the initial position may be a problem.

In an embodiment of the present disclosure, the electronic device 100 may receive the initially captured reference image, and may receive again (i.e., redundantly capture) an image in the already-photographed position in case of returning to the initial photographing position after photographing in one side (left or right) direction, re-generate a thumbnail image by using the input image received again, and thus display the re-generated thumbnail image instead of a thumbnail image synthesized and displayed in real time.

According to an embodiment, the electronic device 100 may generate two synthesis results by using the initially captured reference image 310, the images 311, 312, and 313 captured during movement to a side, and the input images 317, 318, 319, and 310 captured during returning to the initial position, or may generate a synthesis result by selecting an image having better quality or more suitable connection with another input image between the two synthesis results.

The wide self-shot photography may indicate photographing while rotating the electronic device 100 in the left and right directions after capturing the initial reference image, and in another embodiment of the present disclosure, photographing may be performed while rotating the electronic device 100 up and down. In addition, wide self-shot photographing may be performed while rotating the electronic device 100 in any one of the left or right direction.

According to various embodiments, when an error occurs in synthesis during generation of a wide self-shot image, the electronic device 100 may store the first image without storing the wide self-shot image.

Figure 4A:
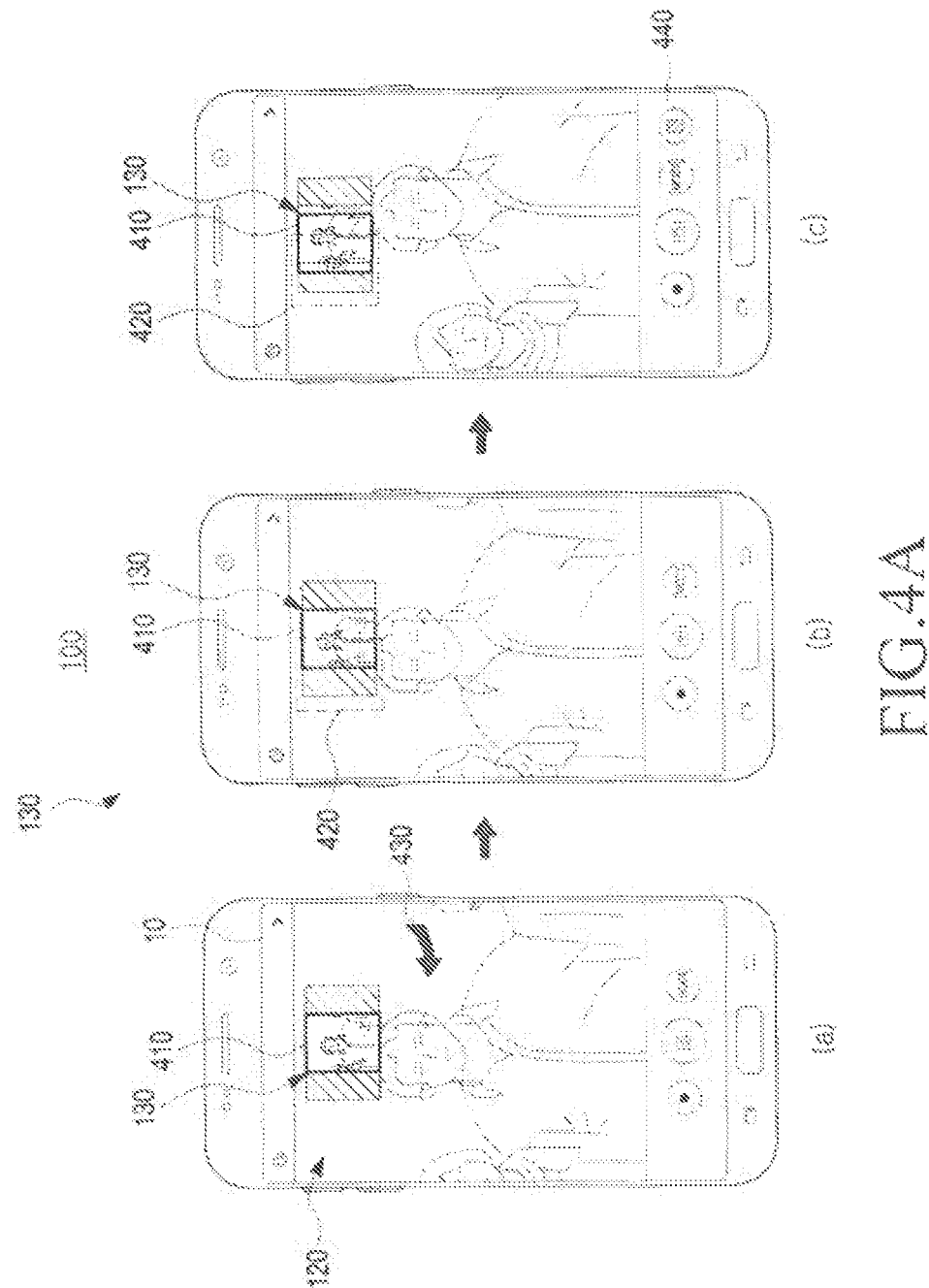

FIGS. 4A and 4B are views for describing a process of performing the wide self-shot function in an electronic device according to an embodiment.

Referring to FIG. 4A, when the electronic device 100 according to an embodiment performs the wide self-shot function, the electronic device 100 may display the second user interface 120 and the third user interface 130 that guide the wide self-photography on the display 10. The third user interface 130 may include a first guide 410 (indicated by a bold solid box) that indicates a state of a currently input image and a second guide 420 (indicated by a dotted box) that guides photography to a next photographing position. The electronic device 100 may further display a user interface indicating a photographing direction. Although not shown, a guide in the form of a message may be displayed in a proper position.

According to an embodiment, the electronic device 100 may apply transparency adjustment or dim processing with respect to a part of the upper end and a lower end of the display 10. After wide self-shot photography, when the electronic device 100 connects captured images, the electronic device 100 may remove offset parts to evenly align the upper end and the lower end. Thus, a part of an upper side and a part of a lower side of an actually input image are removed, such that the electronic device 100 may apply transparency adjustment or dim processing with respect to a part of the display 10 corresponding to a region removed later from the display 10. According to an embodiment, the electronic device 100 may display an input image on the third user interface 130 when performing wide self-shot photography after excluding a region to be removed later.

Referring to FIG. 4A(a), the electronic device 100 may display a start screen for wide self-shot photography. The electronic device 100 may display a currently input image on the display 10 and display a thumbnail image of the input image in the central portion of the third user interface 130.

According to an embodiment, the electronic device 100 may identify the rotating direction of the electronic device 100 after capturing the first image and display a proper user interface indicating the identified rotating direction, as described above with reference to FIG. 1. For example, the electronic device 100 may display a user interface 430 in the form of an arrow to guide user's manipulation with respect to the electronic device 100. The electronic device 100 may capture the currently input image as a reference image.

Referring FIG. 4A(b) and FIG. 4A(c), the electronic device 100 may properly display the first guide 410 and the second guide 420 on the third user interface 130 along movement of the electronic device 100 and change and display the thumbnail image based on the input image in the third user interface 130.

According to an embodiment, the electronic device 100 may display a photographing stop icon 440 on the display 10. The electronic device 100 may immediately stop wide self-shot photography based on input of the photographing stop icon 440 and generate the second image by using the currently captured images.

Referring to FIG. 4B(a), the electronic device 100 may complete photography to the preset last photographing position to the left. It can be seen that the second guide 420 guiding the next photographing position and the first guide 410 displaying the state of the currently input image overlap each other.

Referring to FIG. 48(b), upon completion of photography to the preset last position to the left, according to an embodiment, the electronic device 100 may display a user interface 450 in the form of an arrow, which causes rotation of the electronic device 100 to the right. The electronic device 100 may move the second guide 420 guiding the next photographing position to the right position of the third user interface 130 and display the second guide 420.

Referring to FIG. 4B(c), the electronic device 100 may complete photography to the preset last photographing position to the right. The electronic device 100 may generate the second image by synthesizing captured frames.

According to an embodiment, the electronic device 100 may generate the second image captured using the wide self-shot function and then display the second user interface (e.g., the user interface 120 of FIG. 1) to continue photographing using the wide self-shot function. However, the present disclosure is not limited to this example. For example, the electronic device 100 may display again the first user interface (e.g., the user interface 110 of FIG. 1) captured using the self-shot function.

FIG. 5 illustrates a situation in which an electronic device according to an embodiment sets a photographing range when the electronic device performs photographing using a wide self-shot function.

Figures 5A, 5B:
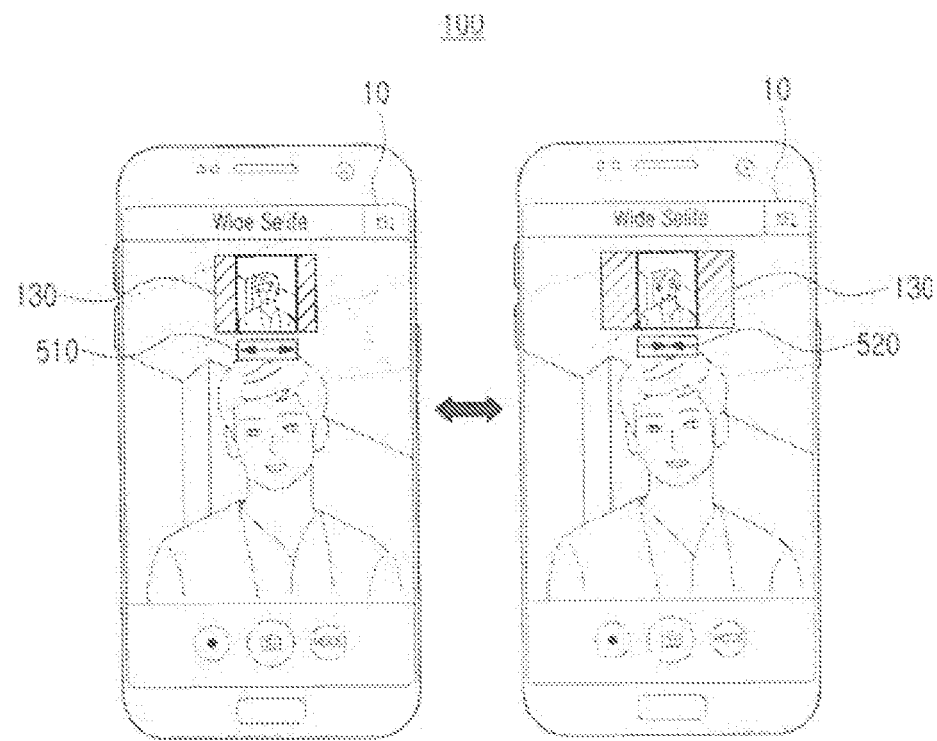
FIG. 5 illustrates a situation in which an electronic device according to an embodiment sets a photographing range when the electronic device performs photography using a wide self-shot function.

Referring to FIG. 5(a) and FIG. 5(b), according to an embodiment, the electronic device 100 may display photographing range setting guides 510 and 520 allowing the user to select a photographing range for wide self-shot photography on the display 10. The user may set the photographing range of a wide self-shot to be photographed, by manipulating the photographing range setting guides 510 and 520.

FIG. 6 illustrates a situation in which an electronic device according to an embodiment selects a desired camera module among a plurality of camera modules.

Figure 6C:
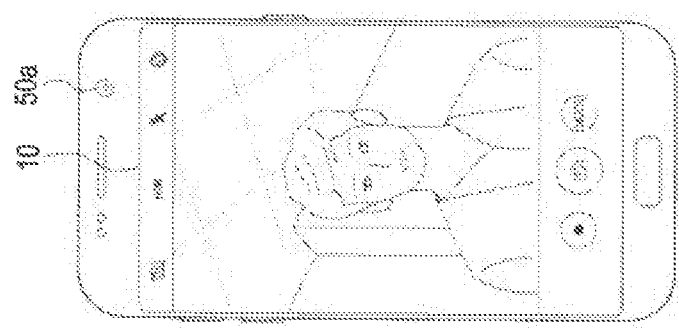
FIG. 6 illustrates a situation in which an electronic device according to an embodiment selects a desired camera module among a plurality of camera modules.
Figure 6B:
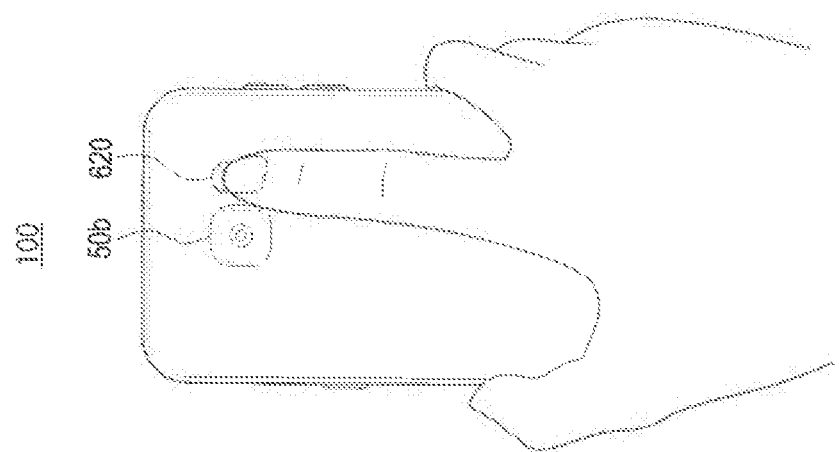
Figure 6A:
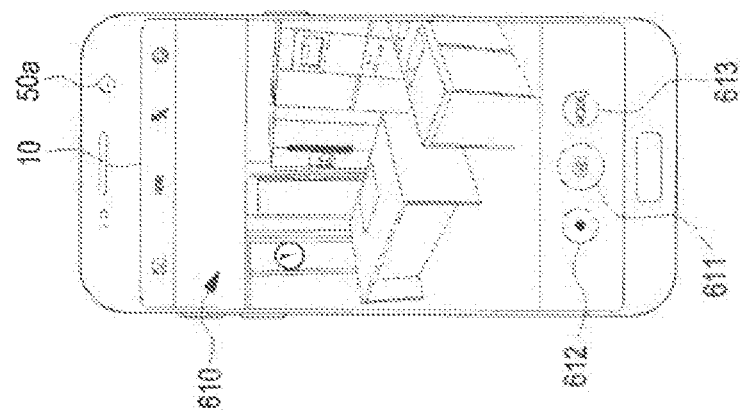

Referring to FIG. 6(a), according to an embodiment, the electronic device 100 may display a user interface 610 for performing the camera function based on input of a signal executing the camera function.

The electronic device 100 displaying the user interface 610 on the display 10 may display an image input through a front camera module 50a, for example, in the central portion of the display 10. The electronic device 100 may display various icons for changing a photography setting value in the upper end of the display 10. The electronic device 100 may display a still image photographing icon 611, a moving image photographing icon 612, a mode changeover icon 613, and so forth.

The electronic device 100 may display on the display 10, an image input through a rear camera module 50b located on the rear surface (e.g., a surface opposite to the surface where the display is arranged) of the electronic device 100.

Referring to FIG. 6(b), the user may touch a sensor 620 located on the rear surface of the electronic device 100 while holding the electronic device 100 such that the display 10 faces the user to photograph or take a self-shot. The sensor 620 may be, for example, a heart rate sensor. However, the present disclosure is not limited to this example. According to an embodiment, the sensor 620 may be a button key, a sensor (e.g., a fingerprint sensor) other than a heart rate sensor, etc.

According to an embodiment, based on a user's touch of the heartrate sensor 620 for a preset time, the electronic device 100 may stop receiving an image through the rear camera module 50b, and activate the front camera module 50a located on the front surface (e.g., the surface where the display is arranged) of the electronic device 100 and receive an image.

Referring to FIG. 6(c), the electronic device 100 may display on the display 10, the image input through the front camera module 50a arranged on the front surface. In this case, the user may sequentially capture the first image and the second image by using the self-shot function and the wide self-shot function described above in detail with reference to FIG. 1.

Moreover, the electronic device 100 may perform an operation described with reference to FIG. 1 through the heartrate sensor 620. For example, after generating the first image, the electronic device 100 may compare the second frame with the third frame during input of the signal through the heartrate sensor 620 to activate the wide self-shot function. After generating the first image, the electronic device 100 may also activate the wide self-shot function when the electronic device 100 moves a preset angle for a preset time during input of the signal through the heartrate sensor 620.

FIG. 7 illustrates an operation when similarities of frames sequentially input to an electronic device according to an embodiment are less than a preset value.

Referring to FIG. 7(a), the electronic device 100 may include a plurality of camera modules 51a and 51b on the front surface (e.g., the surface on which the display is arranged). The plurality of camera modules 51a and 51b may have different angles of view. For example, the first camera module 51a may have an angle of view of 18 mm, and the second camera module 51b may have an angle of view of 35 mm. The angle of view of 18 mm may allow photography of a larger region than the angle of view of 35 mm.

Referring to FIG. 7(a), the electronic device 100 may activate the second camera module 51b based on input of a signal that activates the camera function and display on the display 10, an image input through the second camera module 51b on the display 10.

The electronic device 100 may generate as the first image, an image (e.g., the first image frame) currently input by a touch of the still image photographing icon 711. However, the present disclosure is not limited to this example. For example, the electronic device 100 may capture the currently input image by using a heartrate sensor (not shown) arranged on a rear surface of the electronic device 100 (e.g., a surface opposite to the front surface where the display 10 is arranged). The electronic device 100 may also capture the currently input image by recognizing a preset gesture.

According to an embodiment, the electronic device 100 may compare frames sequentially generated after capturing the first image. The electronic device 100 may compare the second frame and the third frame, generated using the image input through the second camera module 51b, with each other after capturing of the first image. For example, the electronic device 100 may compare the second frame with the third frame after changing them into edge-enhanced images. The electronic device 100 may identify that the second frame and the third frame are not similar to each other when the similarity therebetween is identified as being less than 50% as a result of comparison between them. However, a criterion for identifying a similarity between frames is not limited to this example.

Referring to FIG. 7(c), according to an embodiment, the electronic device 100 may activate the first camera module 51a based on the result of comparison between the second frame and the third frame for similarity identification. An image input through the first camera module 51a may display a larger region than an image input through the second camera module 51b.

The electronic device 100 may receive more object information by using the first camera module 51a having a large angle of view. As a result, the electronic device 100 may more edge information, etc., that is useful for similarity comparison. Thus, the electronic device 100 may improve a probability of obtaining a preset value in similarity comparison.

According to an embodiment. The electronic device 100 may include the plurality of camera modules 51a and 51b having different angles of view and perform the wide self-shot function by selecting at least one of the plurality of camera modules 51a and 51b based on a result of similarity comparison.

Figure 8:
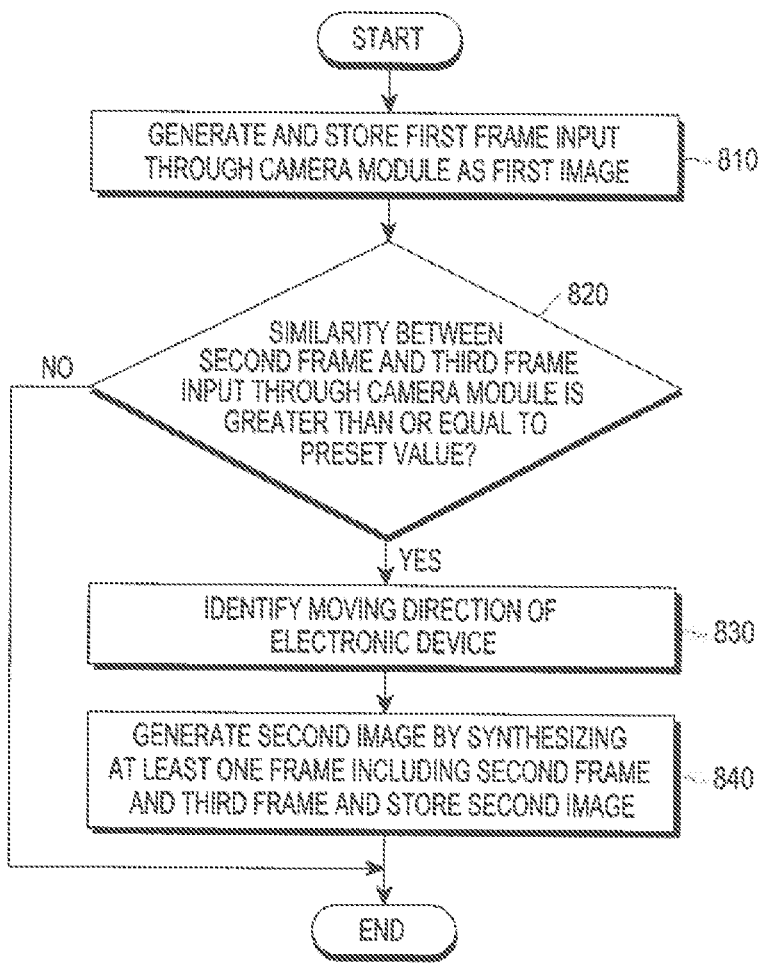
FIG. 8 is a flowchart illustrating a situation in which an electronic device according to an embodiment generates a first image using a self-shot function and captures a second image using a wide self-shot function.

FIG. 8 is a flowchart illustrating a situation in which an electronic device according to an embodiment generates a first image using a self-shot function and captures a second image using a wide self-shot function.

In operation 810, the electronic device 100 may generate and store as the first image, the first frame input through the camera module.

In operation 820, the electronic device 100 may identify whether a similarity between the second frame and the third frame that are input through the camera module is greater than or equal to a preset value. The second frame and the third frame may be continuously generated frames. However, the present disclosure is not limited to this example. For example, the electronic device 100 may select as the third frame, a frame generated after generation of a predetermined number of frames from generation of the second frame. For example, the electronic device 100 may compare the second frame with the third frame after changing them into edge-enhanced images.

In operation 830, when the similarity between the second frame and the third frame is greater than or equal to the preset value, the electronic device 100 may identify a moving or rotating direction of the electronic device 100 based on movement of an object included in the second frame and the third frame. According to another embodiment, the electronic device 100 may identify the moving direction of the electronic device 100 by using the at least one sensor (e.g., the gyro sensor, the acceleration sensor, the electromagnetic sensor, etc.).

When the similarity between the second frame and the third frame is less than the preset value, the electronic device 100 may enter a photographing standby state after storing the first image.

In operation 840, the processor 100 may generate the second image by synthesizing at least one frame including the second frame and the third frame. For example, the electronic device 100 may move within a specific range in the moving or rotating direction identified in operation 830 and move or rotate within a specific range in the opposite direction to receive an input image, and then generate the second image by synthesizing generated frames and store the second image.

However, the present disclosure is not limited to this example. Upon moving beyond the specific range or receiving a signal input for stopping image input while moving in the moving direction identified in operation 830, the electronic device 100 may stop the image input and generate the second image by synthesizing previously generated frames and store them. The electronic device 100 may also delete the stored first image when the second image is generated.

According to various embodiments, the panoramic photographing function may be applied to the normal photographing function. For example, when desiring to capture a landscape image having a wider viewing angle after capturing a landscape image, the user may capture such a wide-viewing angle image by using panoramic photography.

A control method of an electronic device including a camera module according to an embodiment includes storing as a first image, a first frame generated using an image input through a camera module, identifying whether a similarity between a second frame and a third frame that are generated using the image input through the camera module satisfies a preset value, and generating a second image by synthesizing at least one frame comprising the second frame and the third frame, when the similarity is greater than or equal to the preset value.

In the control method of the electronic device including the camera module according to an embodiment, the identifying of whether the similarity between the second frame and the third frame that are generated using the image input through the camera module satisfies the preset value may include identifying the similarity by comparing a shape of an object included in an edge-enhanced second image with a shape of an object included in an edge-enhanced third image after changing the second frame and the third frame into the edge-enhanced second image and the edge-enhanced third image.

In the control method of the electronic device including the camera module according to an embodiment, the identifying of whether the similarity between the second frame and the third frame that are generated using the image input through the camera module satisfies the preset value may include identifying the similarity by comparing a shape of an object included in the second frame with a shape of an object included in the third frame after changing the second frame and the third frame into edge-enhanced images.

In the control method of the electronic device including the camera module according to an embodiment, the identifying of whether the similarity between the second frame and the third frame that are generated using the image input through the camera module satisfies the preset value may include identifying the similarity by comparing a color of an object included in the second frame with a color of an object included in the third frame.

In the control method of the electronic device including the camera module according to an embodiment, the identifying of whether the similarity between the second frame and the third frame that are generated using the image input through the camera module satisfies the preset value may include identifying at least one of a moving direction or a rotating direction of the electronic device based on movement of the object included in the second frame and the object included in the third frame, when the similarity is greater than or equal to a preset value.

In the control method of the electronic device including the camera module according to an embodiment, the electronic device may further include a display, and the identifying of at least one of the moving direction or rotating direction of the electronic device may include identifying the identified moving direction or rotating direction of the electronic device as a first direction and displaying a guide guiding the electronic device in the first direction on the display.

In the control method of the electronic device including the camera module according to an embodiment, the displaying of the guide guiding the electronic device in the first direction on the display may include displaying a guide guiding the electronic device in a second direction opposite to the first direction on the display, when the electronic device moves in the first direction by a preset distance or a preset angle or for a preset time.

The control method of the electronic device including the camera module according to an embodiment may further include generating the second image by synthesizing generated frames, when the electronic device moves in the second direction by a preset distance or a preset angle or for a preset time.

In the control method of the electronic device including the camera module according to an embodiment, the camera module may include a first camera module and a second camera module, the electronic device may further include a sensor module, and the control method may further include stopping activation of the first camera module and activating the second camera module, based on input of at least one of sensors included in the sensor module.

Figure 9:
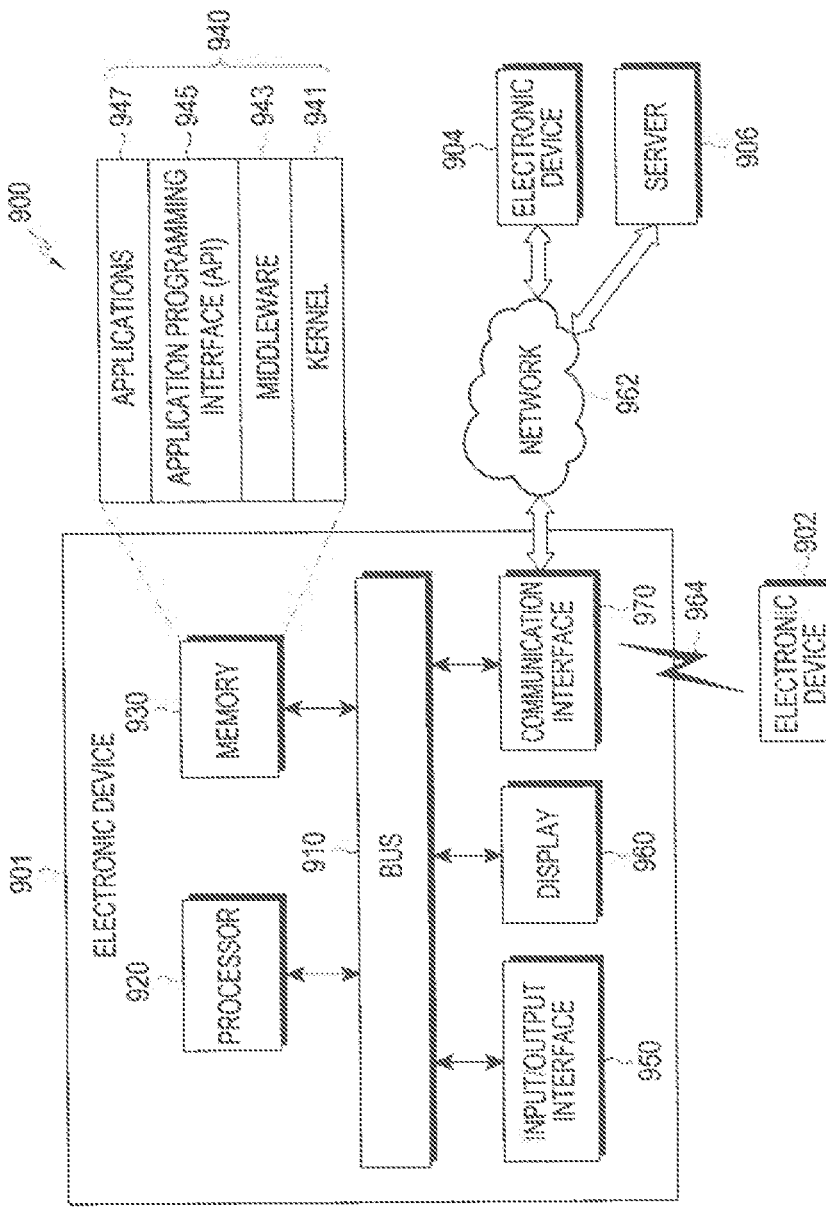
FIG. 9 illustrates an electronic device in a network environment according to various embodiments of the present disclosure.

Referring to FIG. 9. According to various embodiments of the present disclosure, an electronic device 901 in a network environment 900 is disclosed. The electronic device 901 may include a bus 910, a processor 920, a memory 930, an input/output (I/O) interface 950, a display 960, and a communication interface 970. The electronic device 901 may include the electronic device 100 illustrated in FIG. 1. According to some embodiments, the electronic device 901 may omit at least one of the foregoing elements or may further include other elements. The bus 910 may include a circuit for connecting, e.g., the elements 910 to 970 and delivering communication (e.g., a control message or data) between the elements 910 to 970. The processor 920 may include one or more of a central processing unit (CPU), an application processor (AP), and a communication processor (CP). The processor 920 performs operations or data processing for control and/or communication of, for example, at least one other elements of the electronic device 901.

The memory 930 may include a volatile and/or nonvolatile memory. The memory 930 may store, for example, instructions or data associated with at least one other element of the electronic device 901. According to an embodiment of the present disclosure, the memory 930 may store software and/or a program 940. The program 940 may include at least one of, for example, a kernel 941, middleware 943, an application programming interface (API) 945, and/or an application program (or "application") 947, and the like. At least some of the kernel 941, the middleware 943, and the API 945 may be referred to as an operating system (OS). The kernel 941 may control or manage, for example, system resources (e.g., the bus 910, the processor 920, the memory 930, etc.) used to execute operations or functions implemented in other programs (e.g., the middleware 943, the API 945, or the application program 947). The kernel 941 provides an interface through which the middleware 943, the API 945, or the application program 947 accesses separate components of the electronic device 901 to control or manage the system resources.

The middleware 943 may work as an intermediary for allowing, for example, the API 945 or the application program 947 to exchange data in communication with the kernel 941. In addition, the middleware 943 may process one or more task requests received from the application program 947 based on priorities. For example, the middleware 943 may give a priority for using a system resource (e.g., the bus 910, the processor 920, the memory 930, etc.) of the electronic device 901 to at least one of the application programs 947, and may process the one or more task requests. The API 945 is an interface used for the application 947 to control a function provided by the kernel 941 or the middleware 943, and may include, for example, at least one interface or function (e.g., an instruction) for file control, window control, image processing or character control. The I/O interface 950 may deliver, for example, an instruction or data input from a user or another external device to other component(s) of the electronic device 901, or output an instruction or data received from other component(s) of the electronic device 901 to a user or another external device.

The display 960 may include, for example, a liquid crystal display (LCD), a light emitting diode (LED) display, an organic light emitting diode (OLED) display, a microelectromechanical system (MEMS) display, or an electronic paper display. The display 960 may, for example, display various contents (e.g., a text, an image, video, an icon, and/or a symbol, etc.) to users. The display 960 may include a touch screen, and receives a touch, a gesture, proximity, or a hovering input, for example, by using an electronic pen or a part of a body of a user. The communication interface 970 establishes communication between the electronic device 901 and an external device (e.g., a first external electronic device 902, a second external electronic device 904, or a server 906). For example, the communication interface 970 may be connected to a network 962 through wireless communication or wired communication to communicate with an external device (e.g., the second external electronic device 904 or the server 906).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard 232 (RS-232), power line communication, a plain old telephone service (POTS), and so forth. The network 962 may include a telecommunications network, for example, at least one of a computer network (e.g., a local area network (LAN) or a wide area network (WAN)), Internet, and a telephone network.

Each of the first external electronic device 902 and the second external electronic device 904 may be a device of the same type as or a different type than the electronic device 901. According to various embodiments of the present disclosure, some or all of operations performed by the electronic device 901 may be performed in another electronic device or a plurality of electronic devices (e.g., the electronic device 902, 904 or the server 906). According to an embodiment of the present disclosure, when the electronic device 901 has to perform a function or a service automatically or at a request, the electronic device 901 may request another device (e.g., the electronic devices 902 or 904 or the server 906) to perform at least some functions associated with the function or the service instead of or in addition to executing the function or the service. The another electronic device (e.g., the electronic device 902 or 904 or the server 906) may execute the requested function or additional function and deliver the execution result to the electronic device 901. The electronic device 101 may then process or further process the received result to provide the requested function or service. To that end, a cloud computing, distributed computing, or client-server computing technology may be used, for example.

Figure 10:
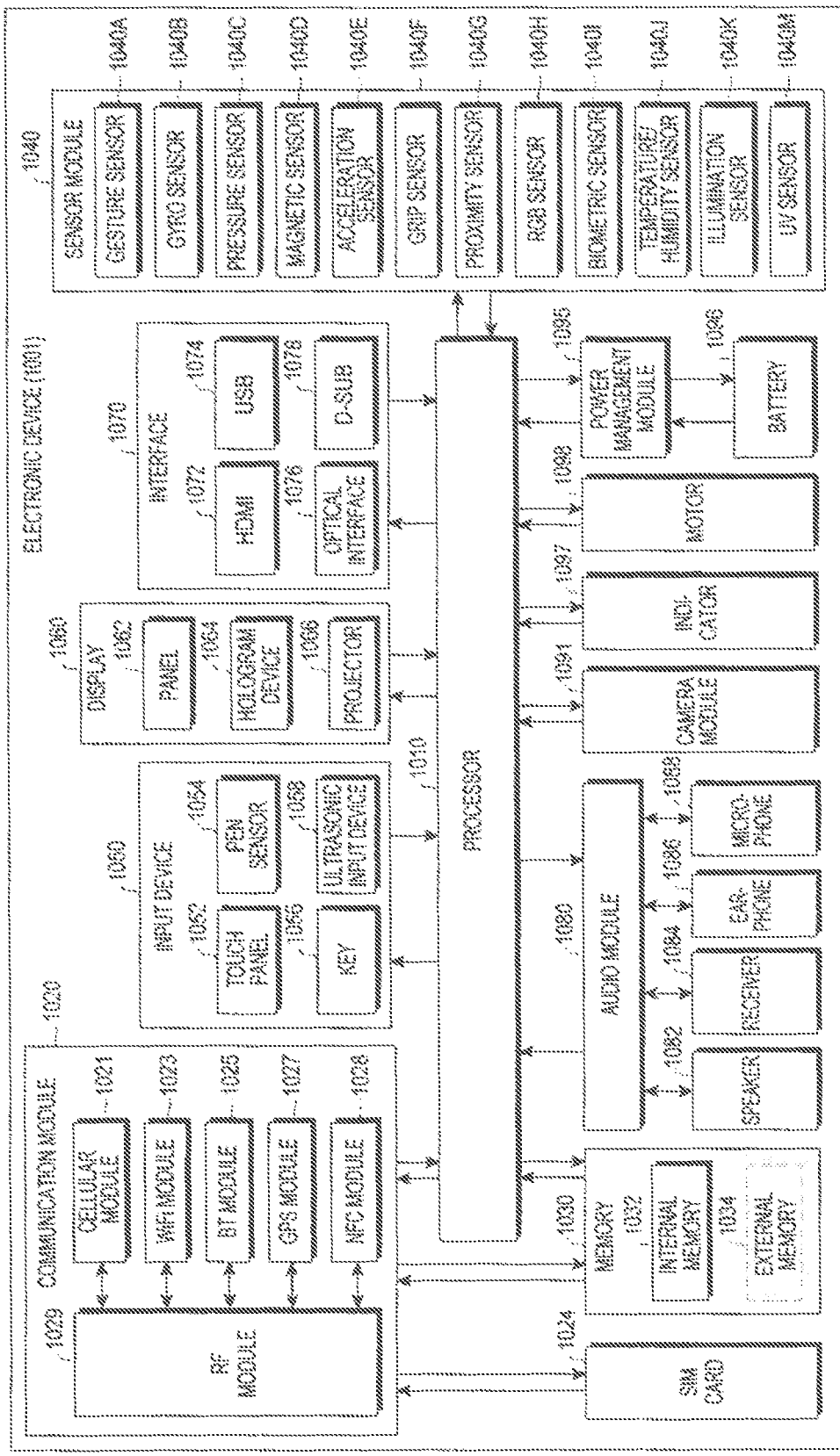
FIG. 10 is a block diagram of an electronic device according to various embodiments of the present disclosure.

FIG. 10 is a block diagram of an electronic device 1001 according to various embodiments of the present disclosure. The electronic device 1001 may include the entire electronic device 901 illustrated in FIG. 9 or the electronic device 100 illustrated in FIG. 1, or a part of the electronic device 100 illustrated in FIG. 2. The electronic device 1001 may include one or more processors (e.g., application processors (APs)) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098. The processor 1010 controls multiple hardware or software components connected to the processor 1010 by driving an operating system (OS) or an application program, and performs processing and operations with respect to various data. The processor 1010 may be implemented with, for example, a system on chip (SoC). According to an embodiment of the present disclosure, the server 1010 may include a graphic processing unit (GPU) and/or an image signal processor. The processor 1010 may include at least some of the elements illustrated in FIG. 10 (e.g., the cellular module 1021). The processor 1010 loads an instruction or data received from at least one of other elements (e.g., a non-volatile memory) into a volatile memory to process the instruction or data, and stores result data in the non-volatile memory.

The communication module 1020 may have a configuration that is the same as or similar to the communication interface 970. The communication module 1020 may include, for example, the cellular module 1021, a WiFi module 1023, a Bluetooth (BT) module 1025, a GNSS module 1027, an NFC module 1028, and a radio frequency (RF) module 1029. The cellular module 1021 may provide, for example, a voice call, a video call, a text service, or an Internet service over a communication network. According to an embodiment, the cellular module 1021 identifies and authenticates the electronic device 1001 in a communication network by using the SIM 1024 (e.g., a SIM card). According to an embodiment, the cellular module 1021 may perform at least one of functions that may be provided by the processor 210. According to an embodiment, the cellular module 1021 may include a communication processor (CP). According to some embodiment, at least some (e.g., two or more) of the cellular module 1021, the WiFi module 1023, the BT module 1025, the GNSS module 1027, and the NFC module 1028 may be included in one integrated chip (IC) or IC package. The RF module 1029 may, for example, transmit and receive a communication signal (e.g., an RF signal). The RF module 1029 may include a transceiver, a power amplifier module (PAM), a frequency filter, a low noise amplifier (LNA), or an antenna. According to another embodiment, at least one of the cellular module 1021, the WiFi module 1023, the BT module 1025, the GNSS module 1027, and the NFC module 1028 may transmit and receive an RF signal through the separate RF module. The SIM 1024 may, for example, include a card including a SIM or an embedded SIM, and may include unique identification information (e.g., an integrated circuit card identifier (ICCID) or subscriber information (e.g., an international mobile subscriber identity (IMSI)).

The memory 1030 (e.g., the memory 930) may, for example, include an internal memory 1032 and/or an external memory 1034. The internal memory 1032 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 1034 may further include flash drive, for example, compact flash (CF), secure digital (SD), micro-SD, mini-SD, extreme Digital (xD), a multi-media card (MMC), or a memory stick. The external memory 1034 may be functionally or physically connected with the electronic device 1001 through various interfaces.

The sensor module 1040 measures physical quantity or senses an operation state of the electronic device 1001 to convert the measured or sensed information into an electric signal. The sensor module 1040 may, for example, include at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor 1040H (e.g., red/green/blue (RGB) sensor), a biometric sensor 1040I, a temperature/humidity sensor 1040J, an illumination sensor 1040K, and an ultraviolet (UV) sensor 1040M. Additionally or alternatively, the sensor module 1040 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 1040 may further include a control circuit for controlling at least one sensor included therein. In some embodiment, the electronic device 1001 may further include a processor configured to control the sensor module 1040 as part of or separately from the processor 1010, to control the sensor module 1040 during a sleep state of the processor 1010.

The input device 1050 may include, for example, a touch panel 1052, a (digital) pen sensor 1054, a key 1056, or an ultrasonic input device 1058. The touch panel 1052 may use at least one of a capacitive type, a resistive type, an IR type, or an ultrasonic type. The touch panel 1052 may further include a control circuit. The touch panel 1052 may further include a tactile layer to provide tactile reaction to the user. The (digital) pen sensor 1054 may include a recognition sheet which is a part of the touch panel 252 or a separate recognition sheet. The key 1056 may also include a physical button, an optical key, or a keypad. The ultrasonic input device 1058 senses ultrasonic waves generated by an input means through a microphone (e.g., the microphone 1088) and checks data corresponding to the sensed ultrasonic waves.

The display 1060 (e.g., the display 960) may include a panel 1062, a hologram device 1064, a projector 1066, and/or a control circuit for controlling them. The panel 1062 may be implemented to be flexible, transparent, or wearable. The panel 1062 may be configured with the touch panel 252 in one module. According to an embodiment, the panel 1062 may include a pressure sensor (or a "force sensor", interchangeably used hereinafter) capable of measuring a strength of a pressure by a user's touch. The pressure sensor may be implemented integrally with the touch panel 1052 or may be implemented as one or more sensors separate from the touch panel 1052. The hologram device 1064 may show a stereoscopic image in the air by using interference of light. The projector 1066 may display an image onto a screen through projection of light. The screen may be positioned inside or outside the electronic device 1001. The interface 1070 may include an HDMI 1072, a USB 1074, an optical interface 1076, or a D-subminiature (D-sub) 1078. The interface 1070 may be included in the communication interface 970 illustrated in FIG. 9. Additionally or alternatively, the interface 1070 may include a mobile high-definition link (MHL) interface, an SD/multi-media card (MMC) interface, or an Infrared Data Association (IrDA) interface.

The audio module 1080 may bi-directionally convert sound and an electric signal. At least one element of the audio module 1080 may be included in the I/O interface 945 illustrated in FIG. 9. The audio module 1080 may process sound information input or output through the speaker 1082, the receiver 1084, the earphone 1086, or the microphone 1088. The camera module 1091 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 1095 manages power of the electronic device 1001. According to an embodiment, the power management module 1095 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 1096 or the voltage, current, or temperature of the battery 296 during charging. The battery 1096 may include, for example, a rechargeable battery and/or a solar battery.

The indicator 1097 displays a particular state, for example, a booting state, a message state, or a charging state, of the electronic device 1001 or a part thereof (e.g., the processor 1010). The motor 1098 may convert an electric signal into mechanical vibration or generate vibration or a haptic effect. The electronic device 1001 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 1001) may be omitted or may further include other elements, and some of the components may be coupled to form one entity and identically perform functions of the components before being coupled.

Figure 11:
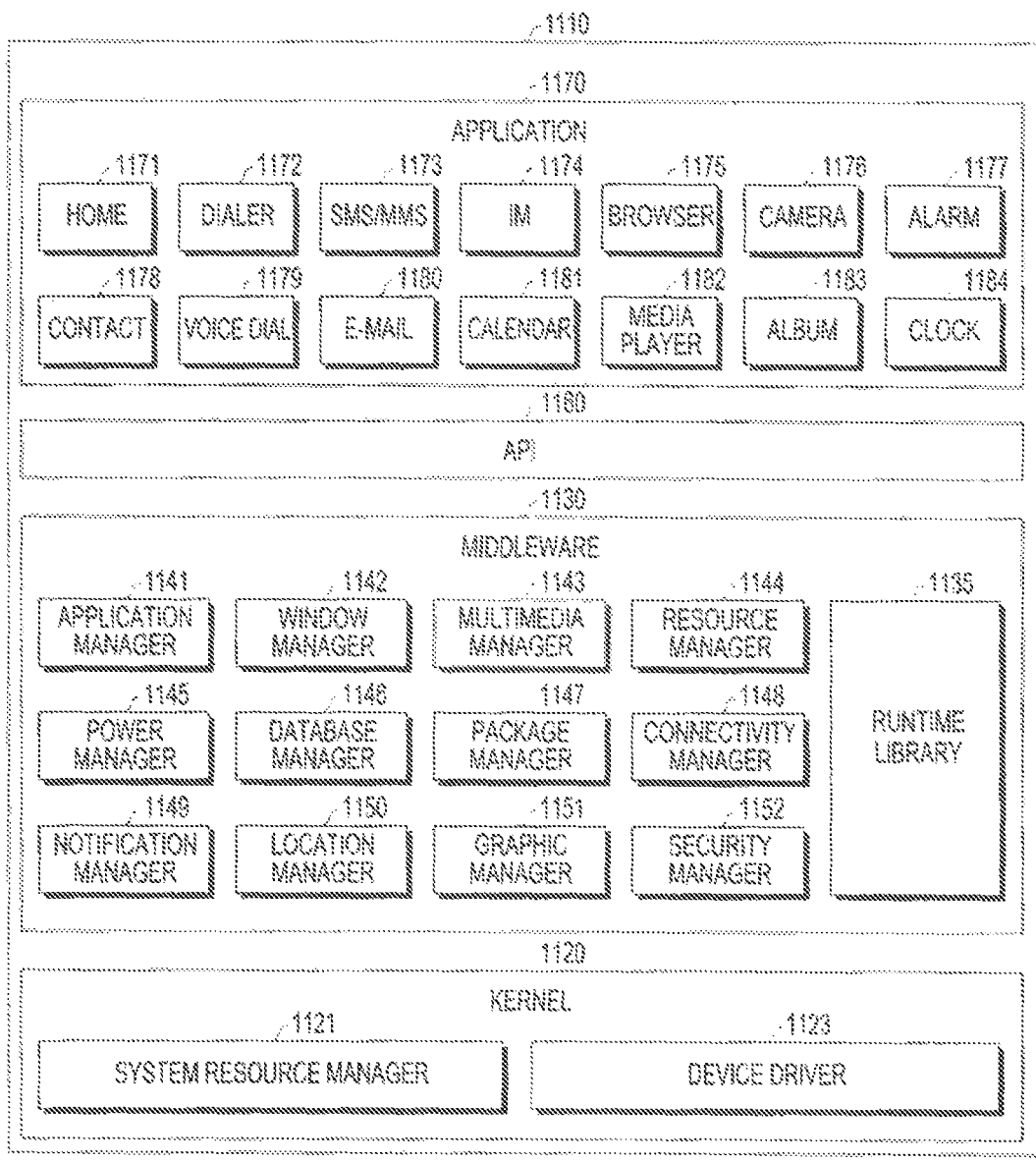
FIG. 11 is a block diagram of a programming module according to various embodiments.

FIG. 11 is a block diagram of a programming module according to various embodiments. According to an embodiment, a programming module 1110 (e.g., the program 940) may include an OS for controlling resources associated with an electronic device (e.g., the electronic device 901 or the electronic device 100) and/or various applications (e.g., the application program 947) executed on the OS. The OS may include Android™, iOS™, Windows™, Symbian™, Tizen™, or Bada™. Referring to FIG. 11, the programming module 1110 may include a kernel 1120 (e.g., the kernel 941), middleware 1130 (e.g., the middleware 943), an application programming interface (API) 1160 (e.g., the API 945), and/or an application 1170 (e.g., the application program 947). At least a part of the programming module 1110 may be preloaded on an electronic device or may be downloaded from an external device (e.g., the electronic device 902 or 904, or the server 906).

The kernel 1120 may include a system resource manager 1121 and/or a device driver 1123. The system resource manager 1121 may perform control, allocation, retrieval of system resources, and so forth. According to an embodiment, the system resource manager 1121 may include a process management unit, a memory management unit, or a file system management unit. The device driver 1123 may include, for example, a display driver, a camera driver, a Bluetooth driver, a shared memory driver, a USB driver, a keypad driver, a WiFi driver, an audio driver, or an inter-process communication (IPC) driver. The middleware 1130 may include providing functions that the application 1170 commonly requires or provide various functions to the application 1170 through the API 1160 to allow the application 1170 to use a limited system resource in an electronic device. According to an embodiment, the middleware 1130 may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The nintime library 1135 may include a library module that a compiler uses to add a new function through a programming language while the application 1170 is executed. The runtime library 1135 performs input/output management, memory management, or calculation function processing. The application manager 1141 manages a life cycle of the applications 1170. The window manager 1142 manages a graphic user interface (GUI) resource used in a screen. The multimedia manager 1143 recognizes a format necessary for playing media files and performs encoding or decoding on a media file by using a codec appropriate for a corresponding format. The resource manager 1144 manages a source code or a memory space of the applications 1170. The power manager 1145 manages a battery or power and provides power information necessary for an operation of the electronic device. According to an embodiment, the power manager 1145 may operate with basic input/output system (BIOS). The database manager 1146 generates, searches or changes a database used for at least one application among the applications 1170. The package manager 1147 manages the installation or update of an application distributed in a package file format.

The connectivity manager 1148 manages a wireless connection. The notification manager 1149 provides an event, e.g., an arriving message, an appointment, proximity notification, etc. The location manager 1150 manages location information of an electronic device. The graphic manager 1151 manages, for example, a graphic effect to be provided to a user or a user interface relating thereto. The security manager 1152 provides, for example, system security or user authentication. According to an embodiment, the middleware 1130 may further include a telephone manager for managing a voice or video call function of the electronic device or a middleware module forming a combination of functions of the above-described components. According to an embodiment, the middleware 1130 provides a module specified for each type of OS. Additionally, the middleware 1130 may delete some of existing elements or add new elements dynamically. The API 1160 may be provided as a set of API programming functions with a different configuration according to the OS. In the case of Android or iOS, for example, one API set may be provided by each platform, and in the case of Tizen, two or more API sets may be provided.

The application 1170 may include one or more applications capable of providing a function, for example, a home application 1171, a dialer application 1172, a short messaging service/multimedia messaging service (SMS/MMS) application 1173, an instant message (IM) application 1174, a browser application 1175, a camera application 1176, an alarm application 1177, a contact application 1178, a voice dial application 1179, an e-mail application 1180, a calendar application 1181, a media player application 1182, an album application 1183, a clock application 1184, a health care application (e.g., an application for measuring an exercise amount, a blood sugar, etc.), or an environment information providing application (e.g., an application for providing air pressure, humidity, or temperature information or the like). According to an embodiment, the application 1170 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 1170 may include an application (e.g., device health care application of mobile medical equipment) designated according to an attribute of the external electronic device. According to an embodiment, the application 1170 may include an application received from the external electronic device. The at least a part of the programming module 1110 may be implemented (e.g., executed) by software, firmware, hardware (e.g., the processor 1010), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 930) in the form of a programming module. When the instructions are executed by a processor (for example, the processor 920), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
   a camera module including a first camera and a second camera;
   a memory; and
   a processor electrically connected with the camera module and the memory,
   wherein the memory stores instructions configured to cause the processor, when executed, to:
      store a first frame obtained through the first camera as a first image in the memory,
      after obtaining the first frame, obtain through the first camera, a second frame and a third frame sequentially,
      identify whether a similarity between the second frame and the third frame is greater than or equal to a preset value,
      in response to identifying that the similarity is equal to or greater than the preset value, generate a second image by synthesizing a plurality of frames comprising the second frame and the third frame,
      in response to identifying that the similarity is less than the preset value:
         activate the second camera and deactivate the first camera, wherein the first camera and the second camera are arranged on a same surface of the electronic device, and the second camera has an angle of view greater than an angle of view of the first camera, and
         generate a third image by synthesizing a plurality of frames which are obtained by the activated second camera, and
      store the generated second image or the generated third image in the memory.

2. The electronic device of claim 1, wherein the instructions are configured to further cause the processor to:
   identify the similarity by comparing a shape of an object located in a periphery of the second frame with a shape of an object located in a periphery of the third frame.

3. The electronic device of claim 1, wherein the instructions are configured to further cause the processor to:
   identify the similarity by comparing a shape of an object included in an edge-enhanced second frame with a shape of an object included in an edge-enhanced third frame after changing the second frame and the third frame into the edge-enhanced second frame image and the edge-enhanced third frame.

4. The electronic device of claim 1, wherein the instructions are configured to further cause the processor to:
   identify the similarity by comparing a color of an object included in the second frame with a color of an object included in the third frame.

5. The electronic device of claim 1, wherein the instructions are configured to further cause the processor to:
   identify at least one of a moving direction or a rotating direction of the electronic device based on movement of an object included in the second frame and an object included in the third frame, when the similarity is greater than or equal to the preset value.

6. The electronic device of claim 5, further comprising a display,
   wherein the instructions are configured to cause the processor to:
   identify the identified moving direction or rotating direction of the electronic device as a first direction and to control a guide guiding the electronic device in the first direction to be displayed on the display.

7. The electronic device of claim 6, wherein the instructions are configured to further cause the processor to:
   control a guide guiding the electronic device in a second direction opposite to the first direction to be displayed on the display, when the electronic device moves in the first direction by a preset distance or a preset angle or for a preset time.

8. The electronic device of claim 7, wherein the instructions are configured to further cause the processor to:
   generate the second image by synthesizing generated frames, when the electronic device moves in the second direction by a preset distance or a preset angle or for a preset time.

9. A control method of an electronic device comprising a camera module, the control method comprising:
   storing as a first image, a first frame obtained through a first camera, the camera module including the first camera and a second camera;
   after obtaining the first frame, obtaining, through the first camera, a second frame and a third frame sequentially;
   identifying whether a similarity between the second frame and the third frame is greater than or equal to a preset value;
   in response to identifying that the similarity is greater than the preset value, generating a second image by synthesizing a plurality of frames comprising the second frame and the third frame;
   in response to identifying that the similarity is less than the preset value;

activating the second camera and deactivating the first camera, wherein the first camera and the second camera are arranged on a same surface of the electronic device, and the second camera has an angle of view greater than an angle of view of the first camera; and generating a third image by synthesizing a plurality of frames which are obtained by the activated second camera; and storing the generated second image or the generated third image in a memory of the electronic device.

10. The control method of claim 9, further comprising:
identifying the similarity by comparing a shape of an object located in a periphery of the second frame with a shape of an object located in a periphery of the third frame.

11. The control method of claim 9, further comprising:
identifying at least one of a moving direction or a rotating direction of the electronic device based on movement of the object included in the second frame and the object included in the third frame, when the similarity is greater than or equal to the preset value.

12. The control method of claim 9, further comprising identifying the similarity by comparing a shape of an object included in an edge-enhanced second frame with a shape of an object included in an edge-enhanced third frame after changing the second frame and the third frame into the edge-enhanced second frame image and the edge-enhanced third frame.

13. The control method of claim 9, further comprising identifying the similarity by comparing a color of an object included in the second frame with a color of an object included in the third frame.

14. The control method of claim 11, further comprising:
identifying the identified moving direction or rotating direction of the electronic device as a first direction; and
displaying a guide guiding the electronic device in the first direction to be displayed on a display of the electronic device.

15. The control method of claim 14, wherein displaying the guide further comprises:

displaying a guide guiding the electronic device in a second direction opposite to the first direction on the display, when the electronic device moves in the first direction by a preset distance or a preset angle or for a preset time.

16. The control method of claim 14, wherein generating the second image comprises:
generating the second image by synthesizing generated frames, when the electronic device moves in the second direction by a preset distance or a preset angle or for a preset time.

17. A recording medium having recorded thereon instructions for executing a control method of an electronic device comprising a camera module, the instructions comprise:
storing as a first image, a first frame obtained through a first camera, the camera module including the first camera and a second camera;
after obtaining the first frame, obtaining, through the first camera, a second frame and a third frame sequentially;
identifying whether a similarity between the second frame and the third frame is greater than or equal to a preset value;
in response to identifying that the similarity is greater than the preset value, generating a second image by synthesizing a plurality of frames comprising the second frame and the third frame;
in response to identifying that the similarity is less than the preset value:
activating the second camera and deactivating the first camera, wherein the first camera and the second camera are arranged on a same surface of the electronic device, and the second camera has an angle of view greater than an angle of view of the first camera; and
generating a third image by synthesizing a plurality of frames which are obtained by the activated second camera; and
storing the generated second image in a memory of the electronic device.

* * * * *